(12) United States Patent
Koyama et al.

(10) Patent No.: US 8,351,010 B2
(45) Date of Patent: Jan. 8, 2013

(54) LIQUID CRYSTAL MODULE AND ELECTRONIC APPARATUS

(75) Inventors: Takashi Koyama, Tottori (JP); Hideo Takahashi, Tottori (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 13/030,564

(22) Filed: Feb. 18, 2011

(65) Prior Publication Data

US 2011/0216270 A1 Sep. 8, 2011

(30) Foreign Application Priority Data

Mar. 2, 2010 (JP) ................. P2010-044980

(51) Int. Cl.
*G02F 1/1345* (2006.01)
(52) U.S. Cl. ......... 349/150; 349/149; 349/151; 349/152
(58) Field of Classification Search ........... 349/149–152
See application file for complete search history.

(56) References Cited

FOREIGN PATENT DOCUMENTS

| JP | 2006-018179 | 1/2006 |
|---|---|---|
| JP | 2007-317981 | 12/2007 |
| JP | 2008-166010 | 7/2008 |
| JP | 2008-226965 | 9/2008 |

*Primary Examiner* — Phu Vu
(74) *Attorney, Agent, or Firm* — K&L Gates LLP

(57) ABSTRACT

Disclosed herein is a liquid crystal module having a liquid crystal display panel, and a backlight unit disposed on a back surface of the liquid crystal display panel. The liquid crystal display panel has a flexible printed wiring circuit substrate for a liquid crystal display panel. The backlight unit has a light guiding plate, a light emitting diode for emitting a light, a flexible printed wiring circuit substrate for a light emitting diode, and a case in which the light guiding plate and the flexible printed wiring circuit substrate for a light emitting diode are accommodated. The flexible printed wiring circuit substrate for a liquid crystal display panel extends along a side surface of the case. The flexible printed wiring circuit substrate for a light emitting diode has a derivation portion.

5 Claims, 5 Drawing Sheets

LIQUID CRYSTAL MODULE AND ELECTRONIC APPARATUS

CROSS REFERENCES TO RELATED APPLICATIONS

The present application claims priority to Japanese Priority Patent Application JP 2010-044980 filed in the Japan Patent Office on Mar. 2, 2010, the entire content of which is hereby incorporated by reference.

BACKGROUND

The present application relates to a liquid crystal module and an electronic apparatus, and more particularly to a liquid crystal module in which a flexible printed wiring circuit (hereinafter referred to as "an FPC") substrate for a light emitting diode (hereinafter referred to as "an LED") as a backlight light source is electrically connected to an FPC substrate for a liquid crystal display panel, and an electronic apparatus using the same.

A liquid crystal display panel is used as a display panel in many electronic apparatuses because the liquid crystal display panel has the features such as light weight, slimness and low power consumption as compared with a Cathode Ray Tube (CRT). The liquid crystal display panel is such that an alignment of liquid crystal molecules arranged in a predetermined direction is changed by application of an electric field to change an amount of light transmitted through a liquid crystal layer, thereby displaying an image on the liquid crystal display panel. With regard to the light made incident to the liquid crystal layer, there are an outside light in a reflection type liquid crystal display panel, and a light emitted from a backlight light source in a transmission type liquid crystal display panel. The reflection type liquid crystal display panel has an advantage that electric power saving is obtained and visibility under a strong outside light is high. On the other hand, the reflection type liquid crystal display panel has an advantage that the visibility in a dark environment is high. In addition, a semi-transmission type liquid crystal display panel is also known which has the features of both the reflection type liquid crystal display panel, and the transmission type liquid crystal display panel.

Owing to the advantage that the visibility under the dark environment is high, almost the liquid crystal display panels are either of the transmission type or of the semi-transmission type. The transmission type or semi-transmission type liquid crystal display panel requires the backlight light source, and thus is manufactured in the form of a liquid crystal module in which a backlight unit is integrally mounted to the liquid crystal display panel.

With regard to the liquid crystal module, right under type and side light type are both known. Here, the right under type liquid crystal module is such that the backlight light source is disposed on a back surface of the liquid crystal display panel. Also, the side light type liquid crystal module is such that a light guiding plate is disposed on the back surface of the liquid crystal display panel, and the backlight light source is disposed on a side surface of the light guiding plate. In the side light type backlight light source, the light emitted from the light source is reflected in a direction of the liquid crystal display panel by the light guiding plate. For this reason, the side light type backlight light source has an advantage that the liquid crystal module can be made thinner in the side light type backlight light source than in the right under type backlight light source, and thus it is easy to uniformize the luminances.

In addition, a cold cathode discharge tube and an LED are used as the backlight light source in many cases. The LED has the following advantages. That is to say, the miniaturization is realized, the electric power consumption is less, and the long life is realized as compared with the case of the cold cathode discharge tube. Also, since mercury causing the environmental pollution is not contained in the LED and the direct current lighting is possible, the LED generates the less high frequency noises and is easy to lighten even at the low temperature. For this reason, the backlight light source composed of the LED is used in a middle-sized or small-sized portable electronic apparatus, especially, a mobile phone, a portable navigation system or the like in many cases. In addition, in recent years, for the purpose of making the best use of advantages that the LED has the less electric power consumption, can be thinned, and shows the high color rendering properties, the LED has come to be used in a large-sized liquid crystal display panel as well.

As shown in Japanese Patent Laid-Open Nos. 2006-018179 and 2008-226965 (referred to as Patent Document 1 and Patent Document 2 hereinafter, respectively) as well, the FPC substrate for an LED to which the LED as the backlight light source is mounted has a derivation portion extending to the outside in order to supply an electric power of a power source to the LED. Also, the derivation portion of the FPC substrate for an LED is electrically connected to an FPC substrate for a liquid crystal display panel for driving the liquid crystal display panel in some cases. In such cases, connection portions of the liquid crystal module can be assembled into one FPC substrate for a liquid crystal display panel. As shown in Patent Document 1 and Patent Document 2 as well, the FPC substrate for an LED is electrically connected to the FPC substrate for a liquid crystal display panel by an anisotropic conductive adhesive agent, soldering, connector connection or the like.

In this connection process, the workability and the bonding quality are both further enhanced in the case where the FPC substrate for a liquid crystal display panel is electrically connected to the FPC substrate for an LED in a state in which it extends planarly without being folded into an L letter-like shape than in any other case. The anisotropic conductive adhesive agent is obtained by mixing a thermosetting resin with fine metallic particles each having a conductive property. A pressure is applied to a part by using a butt having elasticity and heated by a heater or the like to apply a pressure only to the anisotropic conductive adhesive agent abutting against a convex portion of an electrode, thereby electrically connecting the FPC substrate for an LED to the FPC substrate for a liquid crystal display panel. As a result, a conductive path is formed while the conductive particles dispersed within the film contact one another. Since the anisotropic conductive adhesive agent requires the heating pressure bonding as described above, the bonding may be difficult to carry out unless the FPC substrate for a liquid crystal display panel planarly extends.

SUMMARY

However, when the FPC substrate for a liquid crystal display panel is held in the state in which it planarly extends, as shown in Patent Document 1 and Patent Document 2 as well, the derivation portions becoming the connection portions between both the FPC substrates of the liquid crystal module extend in parallel with the display surface of the liquid crystal module. Thus, there is a shortcoming that a size of the liquid crystal module when viewed from the display surface side becomes large by a size for the FPC substrates. For this reason, as shown in Japanese Patent Laid-Open No. 2008-166010 (referred to as Patent Document 3 hereinafter), in the liquid crystal module incorporated in the electronic apparatus, the derivation portions of the FPC substrate for a liquid crystal display panel, and the FPC substrate for an LED are folded.

In addition, with regard to the LED as the backlight light source, side view type and top view type are known. Here, the side view type LED emits a light in a direction parallel with a mounting surface of the LED. Also, the top view type LED emits a light in a direction vertical to the mounting surface of the LED. In the case of the top view type LED, as shown in Patent Document 3 and Japanese Patent Laid-Open No.2007-317981 (referred to as Patent Document 4 hereinafter), the derivation portion of the FPC substrate for a liquid crystal display panel is derived from a back surface side close to the connection portion of the FPC substrate for an LED. This state will be described with reference to FIG. 6 as a vertical cross sectional view of the liquid crystal module.

A liquid crystal module 10E is provided with a reflective sheet 21, a light guiding plate 22, a first diffusion sheet 23, a prism sheet 24, a second diffusion sheet 25, and an inner frame 26E on a bottom case 20E. Also, a liquid crystal display panel 11 is placed on the inner frame 26E and is then fixed by fitting an upper case 13 and the bottom case 20E to each other. Also, an FPC substrate 28 for an LED obtained by mounting an LED 31 to a side surface of the light guiding plate 22 is fixed to an inner surface of the inner frame 26E by a double-sided adhesive tape 30. The liquid crystal module 10E has the construction as described above.

An FPC substrate 19 for a liquid crystal display panel fixed to the liquid crystal display panel 11 is folded to extend in a back surface direction along a side surface of the bottom case 20E. In addition, a derivation portion 42 of the FPC substrate 28 for an LED is derived through a derivation hole 44E provided in a bottom surface of the bottom case 20E to be exposed. As described above, the derivation portion 42 of the FPC substrate 28 for an LED is derived from a position close to a connection portion 46.

With regard to the FPC substrate 19 for a liquid crystal display panel, and the FPC substrate 28 for an LED, as shown in a position A of FIG. 6, the FPC substrate 28 for an LED is electrically connected to the FPC substrate 19 for a liquid crystal display panel in a state in which the upper case 13 is not mounted, and the FPC substrate 19 for a liquid crystal display panel is not folded. Also, the derivation portion 42 of the FPC substrate 28 for an LED long extends so as to reach the connection portion 46. After completion of the connection process, as shown in a position B of FIG. 6, the FPC substrate 19 for a liquid crystal display panel is folded along the side surface of the bottom case 20E, and thus the upper case 13 is fitted to the bottom case 20E.

However, the position where the FPC substrate 19 for a liquid crystal display panel is folded, and the derivation hole 44E of the FPC substrate 28 for an LED are located away from each other. As a result, there is caused such a problem that the FPC substrate 19 for a liquid crystal display panel is folded, the derivation portion 42 of the FPC substrate 28 for an LED is bent by the distance described above. In addition, when a control substrate to which the FPC substrate 19 for a liquid crystal display panel is connected is provided in parallel with the back surface of the bottom case 20E, an exposed portion of the FPC substrate 19 for a liquid crystal display panel is further folded. As a result, the derivation portion 42 of the FPC substrate 28 for an LED is further bent. The bending prevents the miniaturization of the electronic apparatus, and causes the workability for incorporating the liquid crystal module in the electronic apparatus become worse, which causes conduction failure between the FPC substrates.

The present application has been made in order to solve the problems described above, and it is therefore desirable to provide a liquid crystal module in which an FPC substrate for an LED as a backlight light source is electrically connected to an FPC substrate for a liquid crystal display panel, the liquid crystal module being improved in that failures of connection between the FPC substrate for an LED and the FPC substrate for a liquid crystal display panel can be reduced so as to reduce bending of a derivation portion of the FPC substrate for an LED, and an electronic apparatus using the same.

In order to attain the desire described above, according to an embodiment, there is provided a liquid crystal module having a liquid crystal display panel, and a backlight unit disposed on a back surface of the liquid crystal display panel, in which the liquid crystal display panel has a flexible printed wiring circuit substrate for a liquid crystal display panel; the backlight unit has a light guiding plate, a light emitting diode for emitting a light to a side surface of the light guiding plate, a flexible printed wiring circuit substrate for a light emitting diode to which the light emitting diode is mounted, and a case in which the light guiding plate and the flexible printed wiring circuit substrate for a light emitting diode are accommodated; the flexible printed wiring circuit substrate for a liquid crystal display panel extends along a side surface of the case; the flexible printed wiring circuit substrate for a light emitting diode has a derivation portion which is fixed to an inner side of a sidewall of said case and is electrically connected to the flexible printed wiring circuit substrate for a liquid crystal display panel; and the derivation portion of the flexible printed wiring circuit substrate for a light emitting diode is derived from a position closer to the liquid crystal display panel than to a bottom surface of the case to an outside of the backlight unit.

The electrical connection between the FPC substrate for a liquid crystal display panel, and the FPC substrate for an LED is carried out in a state in which the FPC substrate for a liquid crystal display panel is not folded in terms of a problem about a connection work. After that, the FPC substrate for an LED is folded to be shaped so as to extend along the side surface of the case. For this reason, when as with the related art, the derivation portion of the FPC substrate for an LED to which the top view type LED is mounted is derived from the bottom surface side of the case close to the connection portion (from a side away from the liquid crystal display panel of the case), the large bending is caused and a radius of curvature of the bending become small. In addition, even when the FPC substrate for an LED exposed from the liquid crystal module is folded for shaping, the bending thereof also has a small radius of curvature.

In the liquid crystal module of the embodiment, the derivation portion of the FPC substrate for an LED is derived from the upper surface of the case close to the liquid crystal display panel of the case. As a result, a distance between a position where the FPC substrate for a liquid crystal display panel is folded, and a position where the derivation portion of the FPC substrate for an LED is derived becomes shorter than that in the related art. As a result, it is possible to reduce the bending of the derivation portion of the FPC substrate for an LED, and thus it is possible to increase the radius of curvature of the bending. Therefore, according to the liquid crystal module of the embodiment, it is possible to reduce the inhibition for the miniaturization of the electronic apparatus due to the bending of the FPC substrate for an LED, the negative effect for the incorporation work, and the failure of conduction between the FPC substrate for an LED, and the FPC substrate for a liquid crystal display panel.

It is noted that the case in the liquid crystal module of the embodiment means a constituent element which covers at least a part of the bottom surface, the side surfaces and the upper surface of the backlight unit. Thus, a bottom case, a frame body having an opening portion for a light, or the like corresponds to the case in the liquid crystal module. In addition, the form in which the derivation portion is derived from the side close to the liquid crystal display panel of the case contains the case where the derivation hole is provided in an upper side of the side surface of the case, the case where the derivation hole is provided in an upper-side ridge line of the case, and the case where the derivation hole is provided in the upper surface of the case.

Preferably, the derivation portion of the FPC substrate for an LED is derived from the side surface of the case.

According to the liquid crystal module of the embodiment, since it is unnecessary to take that the FPC substrate for an LED is brought into contact with the liquid crystal display panel into consideration, the liquid crystal module can be readily designed.

In addition, preferably, the derivation portion of the FPC substrate for an LED is derived from the upper surface of the case.

According to the liquid crystal module of the embodiment, the derivation portion can be made long in the case where the derivation portion of the FPC substrate for an LED is derived from the upper surface of the case than in the case where the derivation portion of the FPC substrate for an LED is derived from the side surface of the case. Therefore, the incorporation work, and the electrical connection between the FPC substrate for an LED and the FPC substrate for a liquid crystal display panel are easily carried out.

Also, preferably, an attachment for attaching the liquid crystal module is disposed on a bottom surface of the case.

When the attachment is disposed on the bottom surface of the liquid crystal module, a thickness of the backlight unit is increased. In the case of the existing liquid crystal module, the derivation portion of the FPC substrate for an LED is derived from the bottom surface of the backlight unit. Thus, when the thickness of the backlight unit is increased, the distance between the position where the FPC substrate for an LED is folded, and the derivation position of the FPC substrate for an LED becomes long. As a result, the inhibition for the miniaturization of the electronic apparatus due to the bending, the negative effect of the incorporation work, and the conduction failure between both the FPC substrates are increased. However, according to the liquid crystal module of the embodiment, the derivation portion is derived from the side close to the liquid crystal display panel of the backlight unit. Therefore, even when an insertion member is inserted between a bottom case and a reflective sheet to increase the thickness of the backlight unit, the inhibition for the miniaturization of the electronic apparatus due to the bending, the negative effect for the incorporation work, and the conduction failure between both the FPC substrates are prevented from being increased.

In order to attain the desire described above, according to another embodiment, there is provided an electronic apparatus including: a liquid crystal module having a liquid crystal display panel, and a backlight unit disposed on a back surface of the liquid crystal display panel. The liquid crystal display panel has a flexible printed wiring circuit substrate for a liquid crystal display panel. The backlight unit has a light guiding plate, a light emitting diode for emitting a light to a side surface of the light guiding plate, a flexible printed wiring circuit substrate for a light emitting diode to which the light emitting diode is mounted, and a case in which the light guiding plate and the flexible printed wiring circuit substrate for a light emitting diode are accommodated. The flexible printed wiring circuit substrate for a liquid crystal display panel extends along a side surface of the case. The flexible printed wiring circuit substrate for a light emitting diode has a derivation portion which is fixed to an inner side of a sidewall of the case and is electrically connected to the flexible printed wiring circuit substrate for a liquid crystal display panel. The derivation portion of the flexible printed wiring circuit substrate for a light emitting diode is derived from a position closer to the liquid crystal display panel than to a bottom surface of the case to an outside of the backlight unit.

According to the electronic apparatus of the another embodiment, there is obtained the electronic apparatus including the liquid crystal module which can offer the effects described above.

Additional features and advantages are described herein, and will be apparent from the following Detailed Description and the figures.

DETAILED DESCRIPTION

Figure 1:
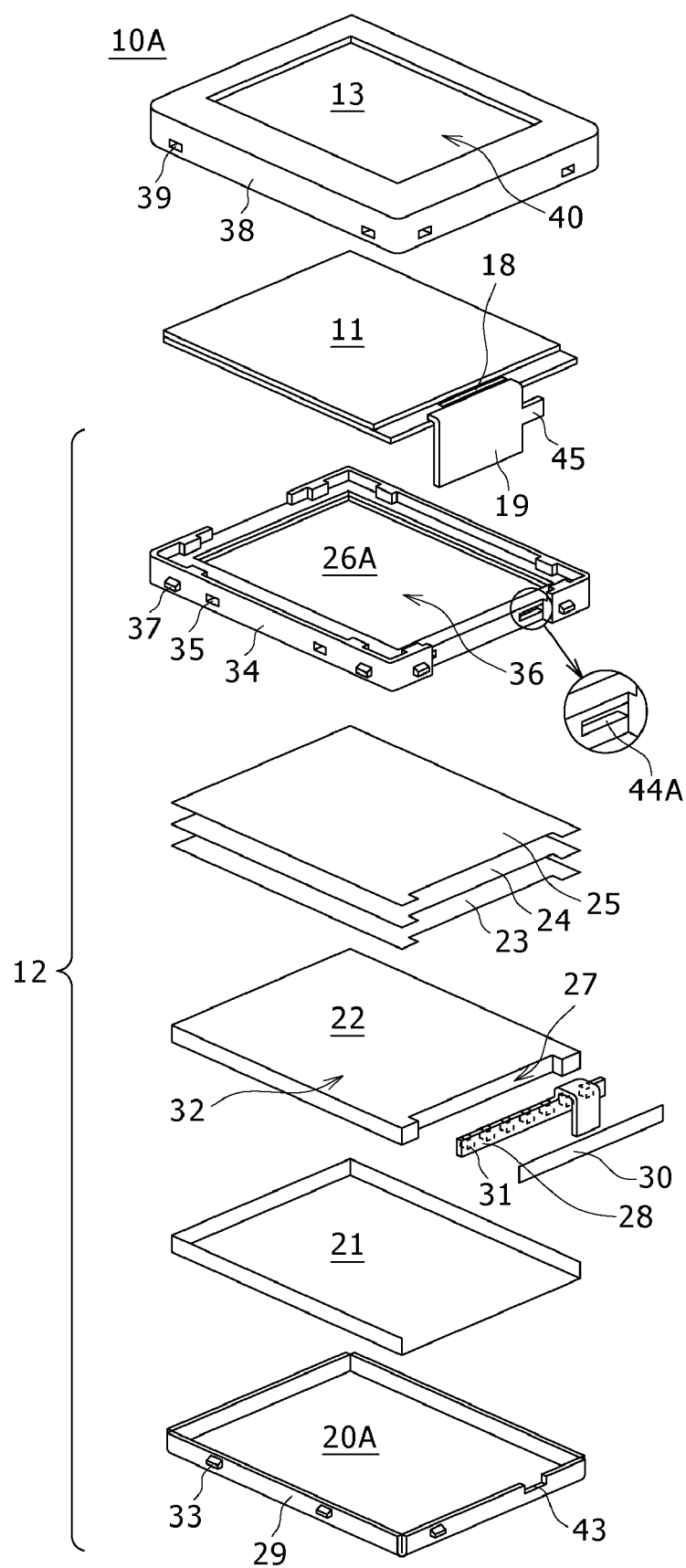
FIG. 1 is an exploded perspective view of a liquid crystal module according to a first embodiment.
Figure 2A:
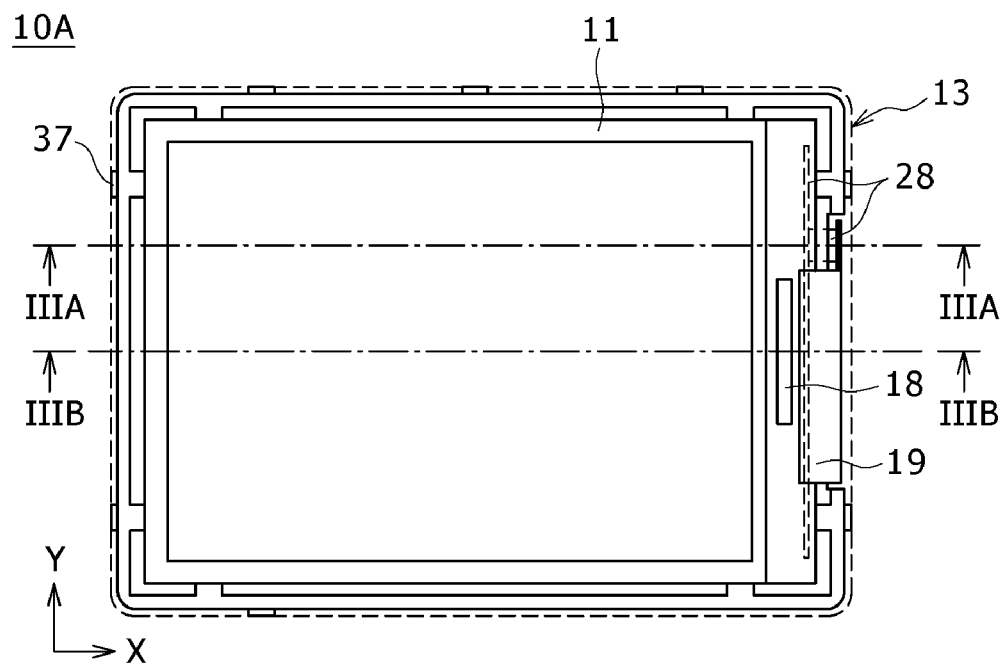
FIGS. 2A and 2B are a top plan view in a state in which an upper case of the liquid crystal module according to the first embodiment is removed, and a right-hand side elevational view showing an FPC substrate, respectively.
Figure 2B:
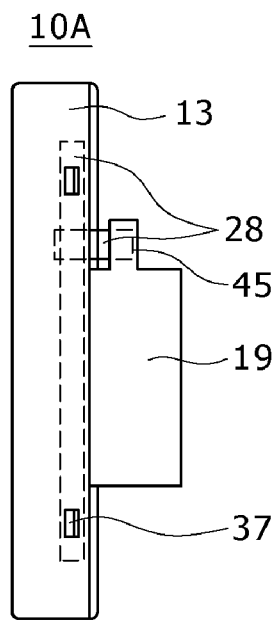

Embodiments of the present application will be described below in detail with reference to the drawings.

However, embodiments which will be described below are not intended to limit the present application to the contents described herein, and thus the present application is equally applied to various kinds of changes made without departing from the technical idea disclosed in the appended claims. It is noted that in the drawings used for the description in this specification, for the purpose of drawing layers and members in such sizes that they can be recognized on the drawings, the layers and the members are drawn on different scale sizes, respectively, and thus are not necessarily drawn in proportion to their actual sizes.

First Embodiment

A liquid crystal module 10A according to a first embodiment will be described in detail hereinafter with reference to FIG. 1 to FIGS. 3A and 3B. The liquid crystal module 10A of the first embodiment includes a transmission type liquid crystal display panel 11, a backlight unit 12, and an upper case 13. In this case, the backlight unit 12 is disposed on a back surface of the transmission type liquid crystal display panel 11. Also, the upper case 13 accommodates therein the liquid crystal display panel 11 so as to sandwich the liquid crystal display panel 11 between the backlight unit 12 and the upper case 13. The liquid crystal display panel 11 includes a liquid crystal layer 14, an array substrate 15 and a color filter substrate 16 between which the liquid crystal layer 14 is sandwiched, a seal material 17, a driver IC 18, and an FPC substrate 19 for a liquid crystal display panel. In this case, the seal material 17 surrounds a circumference of the liquid crystal layer 14 in order to prevent a liquid crystal from leaking. The driver IC 18 drives the liquid crystal display panel 11. Also, the FPC substrate 19 for a liquid crystal display panel receives a video signal from an external control substrate (not shown) and supplies an electric power of a power source to the liquid crystal display panel 11.

As shown in FIG. 1 to FIGS. 3A and 3B, in the backlight unit 12, a bottom case 20A, a reflective sheet 21, a light guiding plate 22, a first diffusion sheet 23, a prism sheet 24, a second diffusion sheet 25, and an inner frame 26A are laminated in this order from the back surface side of the liquid crystal module 10A. Also, in the backlight unit 12, an FPC substrate 28 for an LED is adhered to a sidewall 29 of the bottom case 20A by a double-sided adhesive tape 30 having an excellent thermal conduction property so as to face a side surface 27 of the light guiding plate 22 becoming a light incidence surface.

The bottom case 20A is formed by subjecting a stainless plate to extrusion processing. A white reflective sheet 21 is stuck to the bottom case 20A. Multiple top view type LEDs 31 for emitting white lights to a flexible substrate are disposed on the FPC substrate 28 for an LED. The top view type LED is of a type in which a light is emitted in a direction vertical to a mounting surface. The side surface 27 of the light guiding plate 22 becoming a light incidence surface is subjected to irregularity processing for uniformizing luminances of the incident lights emitted from the multiple LEDs 31, respectively. Also, an upper surface 32 of the light guiding plate 22 becoming a light emission surface is subjected to irregularity processing for condensing the lights in a desired direction. The first diffusion sheet 23 and the second diffusion sheet 25 are provided so that the lights are diffused so as for the luminances to be uniform. Also, the prism sheet 24 is provided in order to condense the lights directed in an X-axis direction of FIG. 2A (in a transverse direction for display) on the liquid crystal display panel 11 side.

Figure 3A:
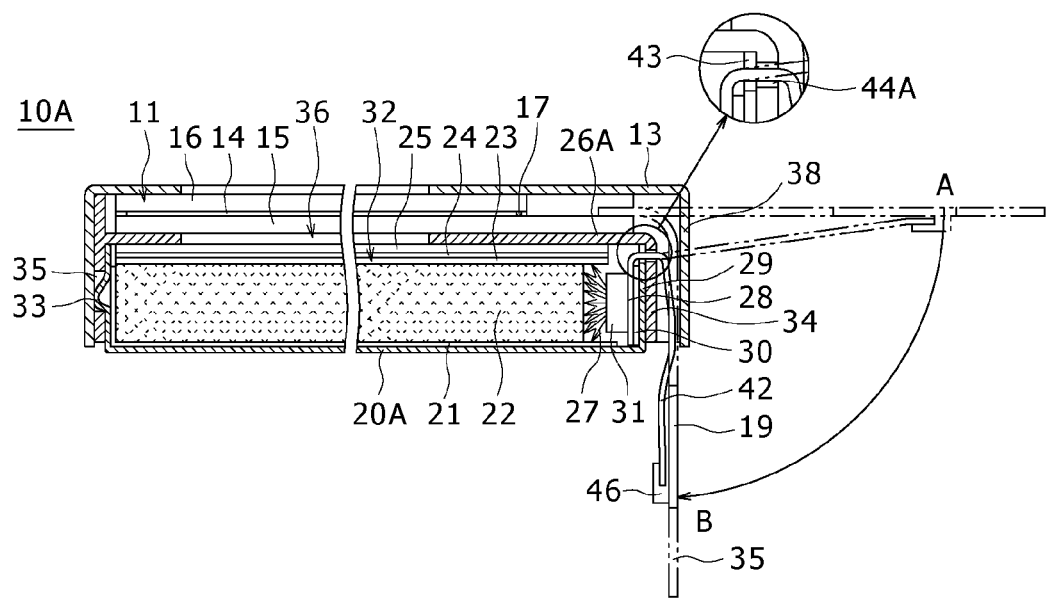
FIGS. 3A and 3B are a cross sectional view taken on line IIIA-IIIA of FIG. 2A, and a cross sectional view taken on line IIIB-IIIB of FIG. 2A, respectively.

The inner frame 26A is made of a synthetic resin and is formed in an injection molding process. The inner frame 26A is fitted to the bottom case 20A to accommodate therein the reflective sheet 21, the light guiding plate 22, the first diffusion sheet 23, the prism sheet 24, the second diffusion sheet 25, and an LED 31 mounting portion of the FPC substrate 28 for an LED. A protrusion 33 of the sidewall 29 of the bottom case 20A is engaged with a rectangular hole 35 of the sidewall 34 of the inner frame 26A, thereby mechanically coupling the bottom case 20A and the inner frame 26A to each other. As shown in FIG. 1 and FIG. 3A, the inner frame 26A has a picture frame-like shape which has a first opening 36 through which the light passes at a center thereof.

The upper case 13 is formed by subjecting a stainless plate to sheet-metal processing. It is noted that the upper case 13 can also be formed by carrying out extrusion processing. The upper case 13 is fitted to the inner frame 26A to accommodate the liquid crystal display panel. A protrusion 37 of the sidewall 34 of the inner frame 26A is engaged with a rectangular hole 39 of the sidewall 38 of the upper case 13, thereby mechanically coupling the inner frame 26A and the upper case 13 to each other. As shown in FIG. 1, the upper case 13 has a picture frame-like shape which has a second opening 40 becoming a display window at a center thereof.

With the construction described above, the lights radiated from the LEDs 31 in the FPC substrate 28 for an LED are diffused through the side surface 27 of the light guiding plate 22, are reflected and diffused through the reflective sheet 21, and are increased in luminance thereof in a predetermined direction through the light guiding plate 22. Also, the lights are then diffused through the first diffusion sheet 23, are condensed in a predetermined direction through the prism sheet 24, are diffused through the second diffusion sheet 25, and are then radiated to the back surface of the liquid crystal display panel 11.

Figure 3B:
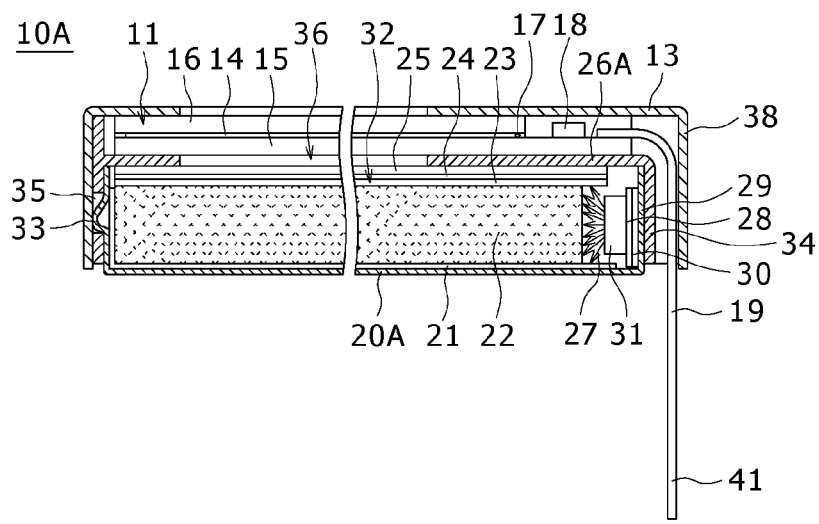

Next, a description will be given with respect to the connection between the FPC substrate 28 for an LED and the FPC substrate 19 for a liquid crystal display panel. As shown in FIG. 3B, the FPC substrate 19 for a liquid crystal display panel has a derivation portion 41. In this case, one end of the derivation portion 41 is electrically connected to the array substrate 15 of the liquid crystal display panel 11. Also, the derivation portion 41 is folded into an L letter-like shape, passes through a space defined between a sidewall 34 of the inner frame 26A, and a sidewall 38 of the upper case 13, and extends to a back surface of the bottom case 20A to be exposed. The FPC substrate 19 for a liquid crystal display panel is prevented from running over from the liquid crystal display panel 10A in such a manner in terms of front view.

As shown in FIG. 3A, the FPC substrate 28 for an LED in which a portion having the LEDs 31 mounted thereto is stuck to the sidewall 29 of the bottom case 20A has a derivation portion 42 which extends to the liquid crystal display panel 11 side (the upper side of FIG. 3A). The derivation portion 42 passes through a cutway portion 43 (refer to FIG. 1 as well) provided in an outer shape of the sidewall 29 of the bottom case 20A, and passes through a derivation hole 44A (refer to FIG. 1 as well) having a rectangular shape and provided on the liquid crystal display panel 11 side (an upper side of FIG. 3A) of the sidewall 34 of the inner frame 26A by using a slide core. Also, the derivation portion 42 passes through a space defined between the sidewall 34 of the inner frame 26A, and the sidewall 38 of the upper case 13 so as not to overlap the FPC substrate 19 for a liquid crystal display panel, and extends to the back surface of the bottom case 20A to be exposed.

A head portion of the derivation portion 42 of the FPC substrate 28 for an LED is electrically connected to a tongue piece 45 for connection which extends from the FPC substrate 19 for a liquid crystal display panel by a connection portion 46. Although with regard to a connection method, an anisotropic conductive adhesive agent may be used, the soldering or the conductor connection may also be available. As described above, the anisotropic conductive adhesive agent has to undergo the heating pressure bonding. Thus, as shown in a position A of FIG. 3A, the head portion of the derivation portion 42 of the FPC substrate 28 for an LED is electrically connected to the tongue piece 45 for connection of the FPC substrate 19 for a liquid crystal display panel in a state in which the upper case 13 is not mounted and the FPC substrate 19 for a liquid crystal display panel is not folded.

After completion of the connection process, as shown in a position B of FIG. 3A, the FPC substrate 19 for a liquid crystal display panel is folded along the side surface of the bottom case 20A, so that the upper case 13 is fitted to the bottom case 20A. It is noted that even when the FPC substrate 28 for an LED and the FPC substrate 19 for a liquid crystal display panel are connected to each other by either the soldering or the connector connection, the connection is carried out in the state shown in the position A of FIG. 3 in order to enhance the workability.

In the liquid crystal module 10A of the first embodiment, the derivation portion 42 of the FPC substrate 28 for an LED is derived from the liquid crystal display panel 11 side of the side surface of the backlight unit 12 to the outside of the backlight unit 12 in the manner as described above. Therefore, the distance between the position where the FPC substrate 19 for a liquid crystal display panel is folded, and the derivation position for the FPC substrate 28 for an LED becomes shorter than that in the existing method with which the FPC substrate 28 for an LED is derived from the back surface side of the backlight unit 12.

For this reason, the bending of the FPC substrate 28 for an LED when the FPC substrate 19 for a liquid crystal display panel is folded from the position A of FIG. 3A to the position B of FIG. 3A becomes small, and thus the radius of curvature of the bending becomes large (the bending becomes loose). Therefore, it is possible to reduce the inhibition for the miniaturization of the electronic apparatus due to the bending, the negative effect for the incorporation work, and the conduction failure between both the FPC substrates.

In addition, in the liquid crystal module 10A of the first embodiment, the derivation portion 42 of the FPC substrate 28 for an LED is derived from the side surface of the backlight unit 12. Therefore, since it is unnecessary to take that the FPC substrate 28 for an LED is brought into contact with the liquid crystal display panel 11 into consideration, the liquid crystal module 10A can be readily designed.

Second Embodiment

Figure 4A:
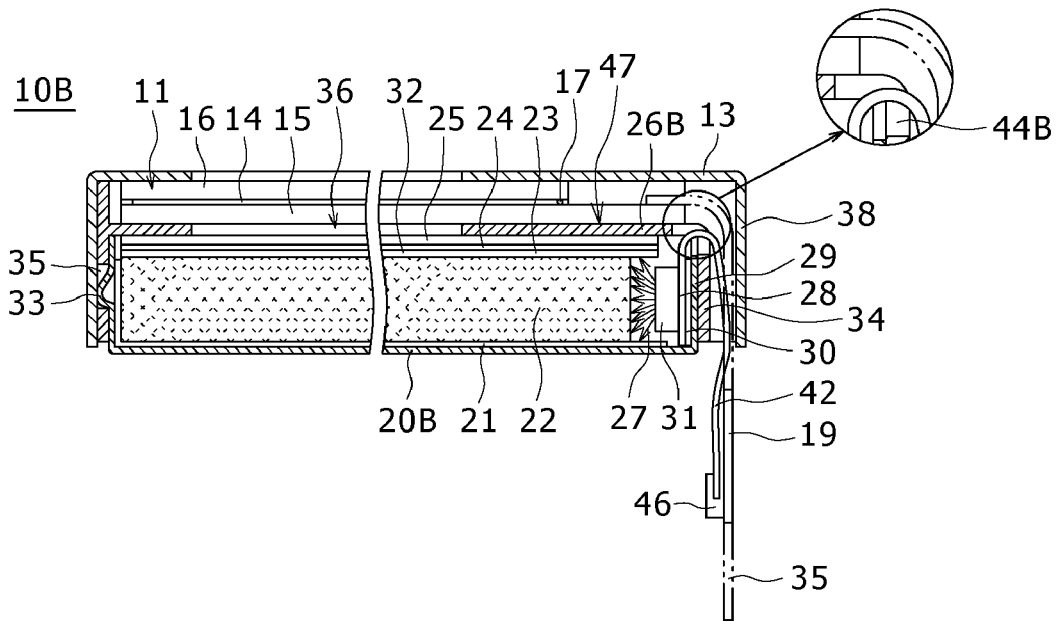
FIG. 4A is a cross sectional view of a liquid crystal module according to a second embodiment.

Next, a liquid crystal module 10B according to a second embodiment will be described in detail with reference to FIG. 4A. FIG. 4A is a cross sectional view corresponding to the portion of the liquid crystal module 10A of the first embodiment shown in FIG. 3A. In the liquid crystal module 10B of the second embodiment, the portions having the same constructions as those in the liquid crystal module 10A of the first embodiment are designated by the same reference numerals, respectively. Also, with regard to the reference numerals each having a suffix A added thereto, the suffix A is changed to a suffix "B," and a detailed description of the constituent elements each having the suffix B added thereto is omitted here for the sake of simplicity. The liquid crystal module 10B of the second embodiment is mainly different in a position of a derivation hole of the FPC substrate 28 for an LED from the liquid crystal module 10A of the first embodiment.

As shown in FIG. 4A, the derivation hole 44B of the FPC substrate 28 for an LED of the liquid crystal module 10B of the second embodiment is formed by confronting a cavity of an injection molding die and a core with each other from the sidewall 34 of the inner frame 26B to a top surface 47 (which is a top surface when viewed from the backlight unit 12, and is also a bottom surface when viewed from the liquid crystal display panel 11) along a ridge line on the liquid crystal display panel 11 side of the backlight unit 12.

The derivation portion 42 of the FPC substrate 28 for an LED passes through the cutway portion 43 provided in the outer shape of the sidewall 29 of the bottom case 20B, and passes through the derivation hole 44B of the inner frame 26B. Also, the derivation portion 42 of the FPC substrate 28 for an LED passes through the space defined between the sidewall 34 of the inner frame 26B, and the sidewall 38 of the upper case 13 so as not to overlap the FPC substrate 19 for a liquid crystal display panel, and extends to the back surface of the bottom case 20B to be exposed. Also, the derivation portion 42 of the FPC substrate 28 for an LED is connected to the FPC substrate 19 for a liquid crystal display panel similarly to the case of the first embodiment. In such a manner, the derivation portion 42 of the FPC substrate 28 for an LED is derived to the outside of the backlight unit 12 via a ridge line direction (in an obliquely upward direction of FIG. 4) of the backlight unit 12.

As a result, the distance between the position where the FPC substrate 19 for a liquid crystal display panel is folded, and the derivation position for the FPC substrate 28 for an LED becomes shorter than that in the first embodiment. Therefore, the inhibition for the miniaturization of the electronic apparatus due to the bending, the negative effect for the incorporation work, and the conduction failure between both the FPC substrates can be further reduced in the liquid crystal module 10B of the second embodiment than in the liquid crystal module 10A of the first embodiment.

Third Embodiment

Figure 4B:
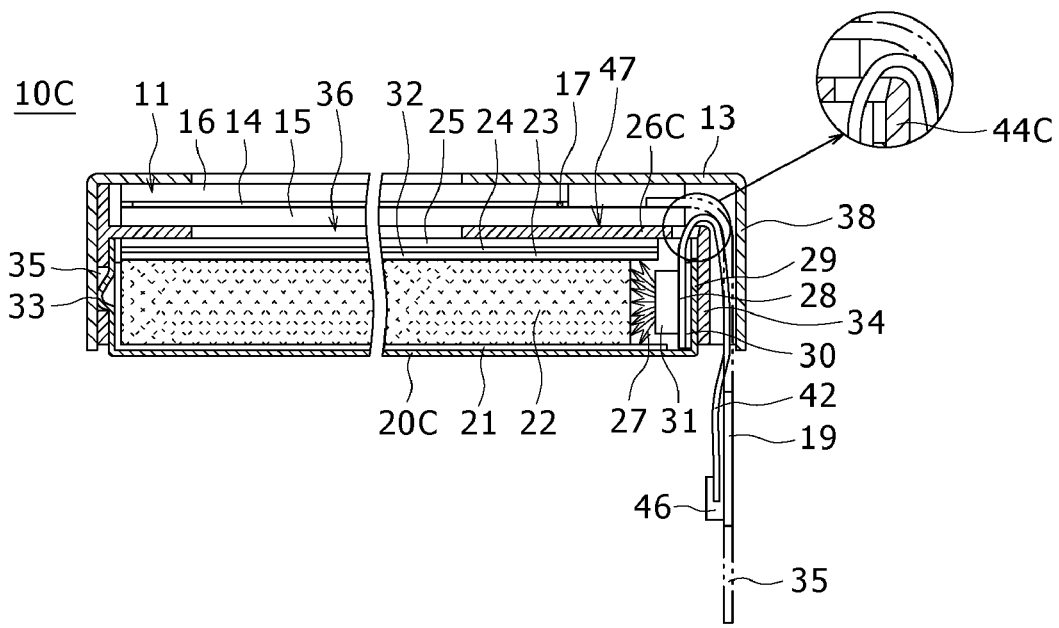
FIG. 4B is a cross sectional view of a liquid crystal module according to a third embodiment.

Next, a liquid crystal module 10C according to a third embodiment will be described in detail with reference to FIG. 4B. FIG. 4B is a cross sectional view corresponding to the portion of the liquid crystal module 10A of the first embodiment shown in FIG. 3A. In the liquid crystal module 10C of the third embodiment, the portions having the same constructions as those in the liquid crystal module 10A of the first embodiment are designated by the same reference numerals, respectively. Also, with regard to the reference numerals each having a suffix A added thereto, the suffix A is changed to a suffix "C," and a detailed description of the constituent elements each having the suffix C added thereto is omitted here for the sake of simplicity. The liquid crystal module 10C of the third embodiment is mainly different in a position of a derivation hole of the FPC substrate 28 for an LED from the liquid crystal module 10A of the first embodiment.

As shown in FIG. 4B, a derivation hole 44C of the liquid crystal module 10C of the third embodiment is formed in the top surface 47 of an inner frame 26C. The derivation portion 42 of the FPC substrate 28 for an LED passes through the cutway portion 43 provided in the outer shape of the sidewall 29 of the bottom case 20C, and passes through the derivation hole 44C of the inner frame 26C. Also, the derivation portion 42 of the FPC substrate 28 for an LED passes through the space defined between the sidewall 34 of the inner frame 26C, and the sidewall 38 of the upper case 13 so as not to overlap the FPC substrate 19 for a liquid crystal display panel, and extends to the back surface of the bottom case 20C to be exposed. Also, the derivation portion 42 of the FPC substrate 28 for an LED is connected to the FPC substrate 19 for a liquid crystal display panel similarly to the case of the first embodiment.

As described above, the derivation portion 42 of the FPC substrate 28 for an LED in the third embodiment is derived to the outside of the backlight unit 12 via a liquid crystal display panel 11 direction (an upper direction of FIG. 4B) of the backlight unit 12. As a result, the distance between the position where the FPC substrate 19 for a liquid crystal display panel is folded, and the derivation position for the FPC substrate 28 for an LED becomes shorter than that in the second embodiment. Therefore, the inhibition for the miniaturization of the electronic apparatus due to the bending, the negative effect for the incorporation work, and the conduction failure between both the FPC substrates can be further reduced in the liquid crystal module 10C of the third embodiment than in the liquid crystal module 10B of the second embodiment.

Fourth Embodiment

Figure 5:
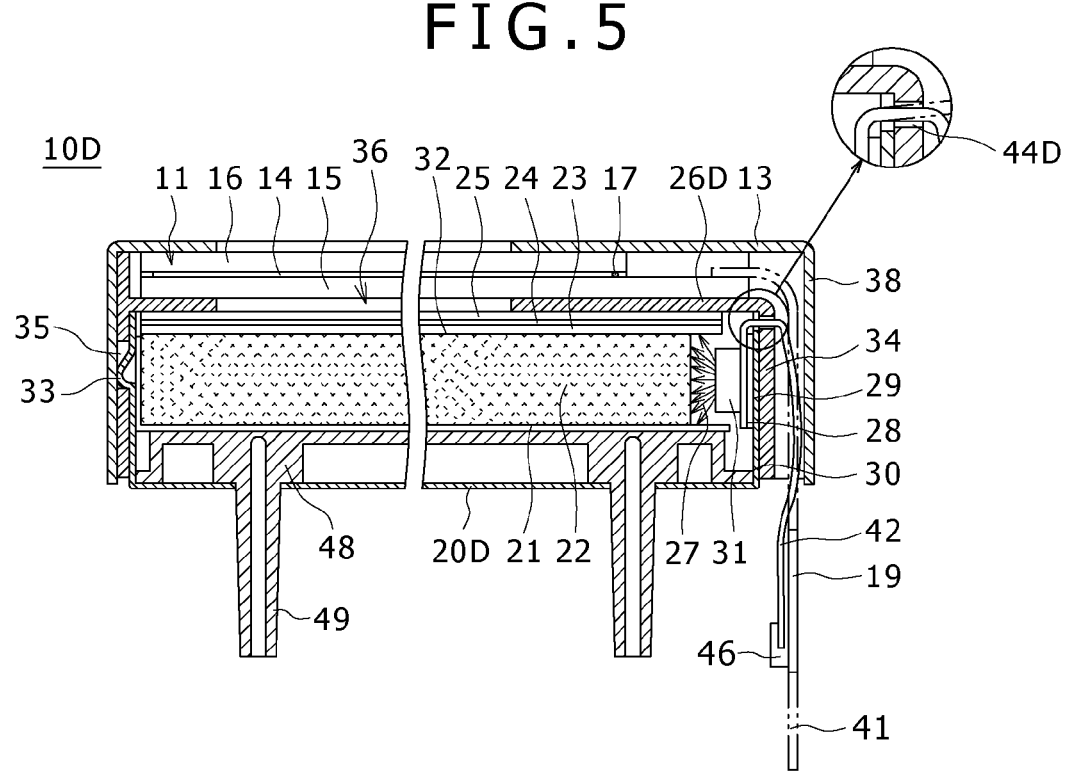
FIG. 5 is a cross sectional view of a liquid crystal module according to a fourth embodiment.
Figure 6:
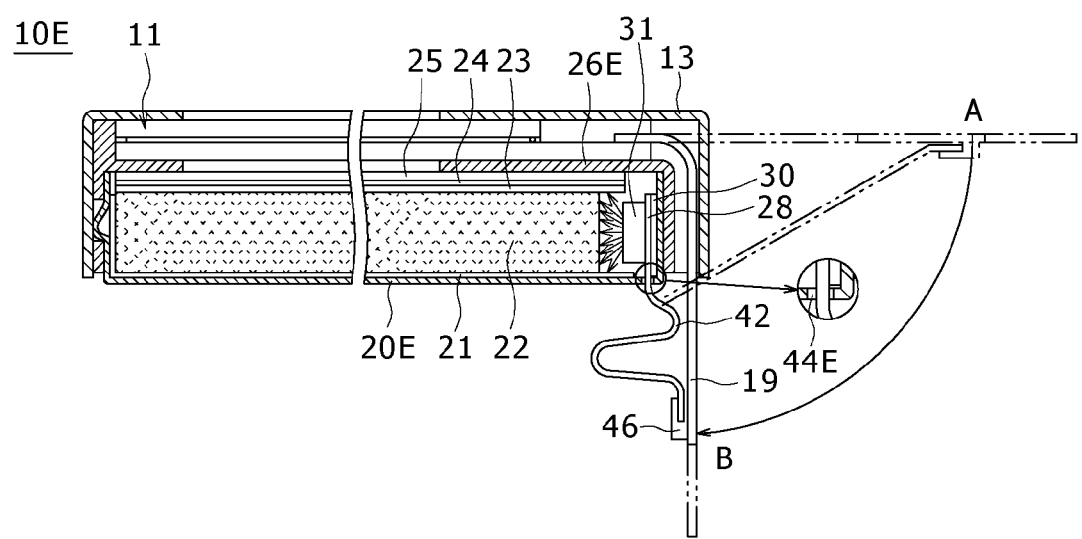
FIG. 6 is a cross sectional view showing an existing liquid crystal module.

Next, a liquid crystal module 10D according to a fourth embodiment will be described in detail with reference to FIG. 5. FIG. 5 is a cross sectional view corresponding to the portion of the liquid crystal module 10A of the first embodiment shown in FIG. 3A. In the liquid crystal module 10D of the fourth embodiment, the portions having the same constructions as those in the liquid crystal module 10A of the first embodiment are designated by the same reference numerals, respectively. Also, with regard to the reference numerals each having a suffix A added thereto, the suffix A is changed to a suffix "D," and a detailed description of the constituent elements each having the suffix D added thereto is omitted here for the sake of simplicity. The liquid crystal module 10D of the fourth embodiment is mainly different in a thickness of the backlight unit from the liquid crystal module 10A of the first embodiment.

A liquid crystal module 10D of the fourth embodiment, as shown in FIG. 5, has an attachment 48 made of a synthetic resin material and formed between a bottom case 20D and the reflective sheet 21 by the injection molding. Multiple bosses 49 each protruding from the bottom case 20D are formed in the attachment 48. The liquid crystal module 10D is mounted to the electronic apparatus by these bosses 49. The provision of the attachment 48 results in that the thickness of the backlight unit 12 in the fourth embodiment is larger than that of the backlight unit 12 in the first embodiment.

In the case of the existing liquid crystal module, the derivation portion of the FPC substrate for an LED is derived from the bottom surface of the backlight unit. Therefore, when the thickness of the backlight unit is increased, the distance between the position where the FPC substrate for an LED is folded, and the derivation position for the FPC substrate 28 for an LED becomes larger than that in the second embodiment. As a result, the inhibition for the miniaturization of the electronic apparatus due to the bending, the negative effect for the incorporation work, and the conduction failure between both the FPC substrates are increased. However, in the liquid crystal module 10D of the fourth embodiment, the derivation portion is derived from the side close to the liquid crystal display panel of the backlight unit. Therefore, even when an insertion member is inserted between the bottom case and the reflective sheet to increase the thickness of the backlight unit, the inhibition for the miniaturization of the electronic apparatus due to the bending, the negative effect for the incorporation work, and the conduction failure between both the FPC substrates are prevented from being increased. It is noted that although in the fourth embodiment, the attachment 48 is disposed inside the bottom case 20D (on the side on which the light guiding plate 22 is disposed), for example, the attachment 48 may also be disposed outside the bottom case 20D. In this case, for example, it is expected that the attachment 48 is adhered and fixed to the outside of the bottom case 20D by using an adhesive member, and so forth.

Fifth Embodiment

The liquid crystal modules have been described so far as the embodiments of the present application. Such a liquid crystal module of the present application can be used in various kinds of electronic apparatuses such as a personal computer, a mobile phone, a personal digital assistant, and a car navigation system.

An electronic apparatus according to a fifth embodiment includes: the liquid crystal module 10A having the liquid crystal display panel 11, and the backlight unit 12 disposed on the back surface of the liquid crystal display panel 11. In this case, the liquid crystal display panel 11 has the FPC substrate 19 for a liquid crystal display panel; the backlight unit 12 has the light guiding plate 22, the LED 31 for emitting the light to the side surface of the light guiding plate 22, the FPC substrate 28 for an LED to which the LED 31 is mounted, and the bottom case 20A in which the light guiding plate 22 and the FPC substrate 28 for an LED are accommodated; the FPC substrate 19 for a liquid crystal display panel extends along the side surface of the bottom case 20A; the FPC substrate 28 for an LED has the derivation portion 42 which is fixed to the inner side of the sidewall of the bottom case 20A and is electrically connected to the FPC substrate 19 for a liquid crystal display panel; and the derivation portion 42 of the FPC substrate 28 for an LED is derived from the position closer to the liquid crystal display panel 11 than to the bottom surface of the bottom case 20A to an outside of said backlight unit.

It should be noted that since the basic configurations of the various kinds of electronic apparatuses are well known to those skilled in the art, detailed descriptions thereof are omitted here for the sake of simplicity.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A liquid crystal module having a liquid crystal display panel, and a backlight unit disposed on a back surface of said liquid crystal display panel,
    wherein said liquid crystal display panel has a flexible printed wiring circuit substrate for a liquid crystal display panel;
    said backlight unit has a light guiding plate, a light emitting diode for emitting a light to a side surface of said light guiding plate, a flexible printed wiring circuit substrate for a light emitting diode to which said light emitting diode is mounted, and a case in which said light guiding plate and said flexible printed wiring circuit substrate for a light emitting diode are accommodated;
    said flexible printed wiring circuit substrate for a liquid crystal display panel extends along a side surface of said case; said flexible printed wiring circuit substrate for a light emitting diode has a derivation portion which is fixed to an inner side of a sidewall of said case and is electrically connected to said flexible printed wiring circuit substrate for a liquid crystal display panel; and
    said derivation portion of said flexible printed wiring circuit substrate for a light emitting diode is derived from a position closer to said liquid crystal display panel than to a bottom surface of said case to an outside of said backlight unit.

2. The liquid crystal module according to claim 1, wherein said derivation portion of said flexible printed wiring circuit substrate for a light emitting diode is derived from said side surface of said case.

3. The liquid crystal module according to claim 1, wherein said derivation portion of said flexible printed wiring circuit substrate for a light emitting diode is derived from said upper surface of said case.

4. The liquid crystal module according to claim 1, wherein an attachment for attaching said liquid crystal module is disposed on a bottom surface of said case.

5. An electronic apparatus, comprising:
- a liquid crystal module having a liquid crystal display panel, and a backlight unit disposed on a back surface of said liquid crystal display panel,
- wherein said liquid crystal display panel has a flexible printed wiring circuit substrate for a liquid crystal display panel;
- said backlight unit has a light guiding plate, a light emitting diode for emitting a light to a side surface of said light guiding plate, a flexible printed wiring circuit substrate for a light emitting diode to which said light emitting diode is mounted, and a case in which said light guiding plate and said flexible printed wiring circuit substrate for a light emitting diode are accommodated;
- said flexible printed wiring circuit substrate for a liquid crystal display panel extends along a side surface of said case; said flexible printed wiring circuit substrate for a light emitting diode has a derivation portion which is fixed to an inner side of a sidewall of said case and is electrically connected to said flexible printed wiring circuit substrate for a liquid crystal display panel; and
- said derivation portion of said flexible printed wiring circuit substrate for a light emitting diode is derived from a position closer to said liquid crystal display panel than to a bottom surface of said case to an outside of said backlight unit.

* * * * *